3,152,125
COMPOUNDS PRODUCED BY INTERACTION OF CERTAIN 10-SUBSTITUTED PHENOTHIAZINES AND CERTAIN 5,5-DISUBSTITUTED MALONYL-UREAS
Alexander Galat, 126 Buckingham Road, Yonkers, N.Y.
No Drawing. Filed Mar. 14, 1962, Ser. No. 179,769
6 Claims. (Cl. 260—243)

This invention relates to new and useful chemotherapeutic compounds. More particularly, this invention relates to compounds formed by the union of certain 10-substituted phenothiazines with certain 5,5-disubstituted malonylureas (5,5-disubstituted barbituric acids) or certain 5,5-disubstituted malonylthioureas which exhibit pronounced physiological activity and many favorable corollary properties. In one specific aspect thereof, this invention relates to the compound formed by the union of 10-(3-dimethylamino propyl) phenothiazine with 5-ethyl 5-phenyl malonylurea.

This is a continuation-in-part of my earlier application, Serial Number 710,625, filed January 23, 1958, now abandoned, for Compounds Produced by Interaction of Certain 10-Substituted Phenothiazines and Certain 5,5-Disubstituted Malonylureas.

As is well known, certain 10-substituted (i.e., N-substituted) phenothiazines or phenothiazine derivatives are effective tranquilizers and antihistamines. Among such materials may be mentioned 10-(3-dimethylamino propyl) phenothiazine (Promazine), 10-(2-dimethylamino 2-methyl ethyl) phenothiazine (Phenergan), 2-chloro 10-(3-dimethylamino propyl) phenothiazine (Chlorpromazine), 10-((1-methyl 3-piperidyl)methyl) phenothiazine (Mepazine), 2-chloro 10-(3-(1-methyl 4-piperazinyl)propyl) phenothiazine (Proclorperazine), 2-chloro 10-(3-(1-(2-hydroxyethyl) 4-piperazinyl) propyl) phenothiazine (Perphenazine), 2-chloro 10-(3-(1-(2-acetoxyethyl) 4-piperazinyl) propyl) phenothiazine (Thiopropazate), and the like. New compounds which are of the same type are: 2-acyl-10-oxyalkyl piperidinoalkyl-phenothiazines as disclosed in Patent Number 3,000,885 and substituted aroylalkyl phenothiazinylalkyl piperazines as disclosed in Patent Number 3,000,886. The phenothiazine structure is numbered as follows:

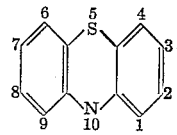

which is the preferred numbering and this system is used in the following disclosure.

The above 10-substituted phenothiazine compounds, and several others of more or less similar structure, are characterized as tranquilizers and are generally employed in the form of salts (e.g. the hydrochlorides) thereof. These compounds, in common with phenothiazine itself, are rather unstable, being quite readily oxidized on exposure to air, particularly in the presence of light. Also, these compounds are sensitive to heat and possess an extremely bitter taste. Finally, these compounds in aqueous media give rise to a low pH which is irritating to tissues that may be in contact therewith.

Because of the above mentioned unfavorable corollary properties of these materials, great care must be exercised in the preparation and isolation of the compounds and in the production of tablets, elixirs and the like from these materials for therapeutic use. Also, because of the extremely bitter taste of these 10-substituted phenothiazines, formulations, particularly elixirs, containing them are poorly accepted by a considerable proportion of patients and due to the high acidity produced when in contact with aqueous media, treatment with these materials frequently is accompanied by irritation of the gastrointestinal tract.

The use of certain 5,5-disubstituted (i.e., C-disubstituted) malonylureas as hypnotics has been practiced for over half a century. The synthesis of this class of compounds may be considered as involving condensation of a disubstituted malonic acid with urea. If thiourea is employed, 5,5-disubstituted malonylthioureas are produced. Among compounds of this class may be mentioned 5,5-diethyl malonylurea (Veronal, Barbital), 5-ethyl 5-(1-methyl butyl) malonylurea (Nembutal, Pentobarbital), 5-ethyl 5-phenyl malonylurea (Phenobarbital, Luminal, Gardenal, Phenobarbitone), 5,5-diethyl malonylthiourea (Thiobarbital, Thiopental), 5-ethyl 5-(1-methyl butyl) malonylthiourea (Thiopentone), and the like.

The malonylurea and malonylthiourea structures are numbered as follows:

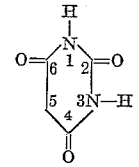

wherein Z is selected from the group consisting of oxy and thio radicals, which is the preferred numbering and this system is used in the following disclosure.

These 5,5-disubstituted malonylureas and malonylthioureas also possess an extremely bitter taste.

Accordingly, it is an object of this invention to provide new and improved chemotherapeutic compounds.

A further object of this invention is to provide new and improved chemotherapeutic compounds exhibiting tranquilizing, antihistaminic and hypnotic effects.

Another object of this invention is to provide stable, tasteless and neutral chemotherapeutic compounds exhibiting tranquilizing, antihistaminic and hypnotic effects.

Additional objects of this invention will become apparent as the description thereof proceeds.

It has been discovered that the 10-substituted phenothiazine tranquilizers of the type set forth above unite, under suitable reaction conditions, with 5,5-disubstituted malonylureas or malonylthioureas to form compounds which not only exhibit a pronounced and highly desirable synergism with respect to the respective physiological activities of the individual reactants used in preparing such compounds but also are devoid of the corollary unfavorable properties exhibited by the individual reactants employed in the production of the new compounds of this invention. Also, the compounds of this invention are stable, not being affected by air, light or heat. The compounds of this invention are devoid of taste and exhibit a neutral reaction in aqueous medium.

The phenothiazines that can be utilized in this invention are those disclosed above and others which exhibit tranquilizing properties. These compounds are generally characterized as 10-substituted phenothiazines and include the compounds set forth above. These 10-substituted phenothiazine compounds function as an electron donor or Lewis base. The 5,5-disubstituted malonylureas and malonylthioureas characterized as hypnotics function as Lewis acids. Thus the non-ionic compounds of this invention are formed by the interaction of a 10-substituted phenothiazine functioning as a Lewis base and a malonylurea or a malonylthiourea functioning as a Lewis acid.

More particularly this invention relates to the compound formed by the interaction of a material having the structural formula:

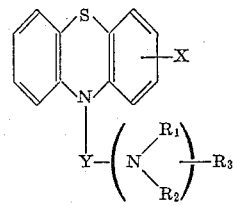

and having tranquilizing properties, wherein X is selected from the group consisting of hydrogen, halo, trifluoromethyl and acyl radicals; wherein Y represents an alkylene radical containing one to eight carbon atoms which can be straight or branched; and $R_1$ and $R_2$ taken individually are selected from the group consisting of lower alkyl radicals; and $R_1$ and $R_2$ taken together with N represents a saturated heterocyclic radical containing six atoms in the ring one of which in addition to the amino nitrogen is selected from the group consisting of carbon and nitrogen and the remaining atoms being carbon, the alkylene attachment being at any point on said ring, and when said ring is substituted $R_3$ is substituted at some portion of said ring and is selected from the group consisting of lower alkyl, hydroxyalkyl, acetoxyalkyl and phenylacylalkyl radicals; and a material having the structural formula:

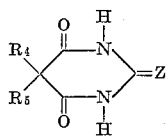

wherein $R_4$ and $R_5$ are each selected from the group consisting of lower alkyl and phenyl radicals and Z is selected from the group consisting of oxy and thio radicals.

In particular, the preferred phenothiazines utilized in this invention are characterized as having the structural formula:

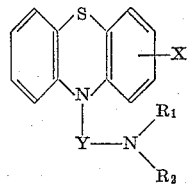

wherein X is selected from the group consisting of a halo radical and hydrogen, Y represents an alkylene radical containing one to eight carbon atoms which can be straight or branched, and $R_1$ and $R_2$ are selected from the group consisting of lower alkyl radicals. These compounds are of the type that are relatively inexpensive and thus are valuable as starting compounds. Such a compound is 10-(3-dimethylamino propyl)phenothiazine.

In particular, the preferred 5,5-disubstituted malonylureas and 5,5-disubstituted malonylthioureas are those which have one 5-position substituent which is selected from the group consisting of lower alkyl radicals and the other 5-position substituent is selected from the group consisting of phenyl and lower alkyl radicals.

Lower alkyl as used in this invention is used to designate an alkyl radical having one to eight carbon atoms which may be straight or branched.

For the better understanding of this invention the following illustrative but non-limiting examples thereof are given.

Example 1

A mixture of 284 g. (one mole) 10-(3-dimethylamino propyl) phenothiazine (Promazine) and 232 g. (one mole) 5-ethyl 5-phenyl malonylurea (Phenobarbital) was heated on a water bath for about ten minutes. At the end of this time two liters of isopropanol were added with stirring and after solution was complete the resulting solution was filtered through a Filter:Cel-decolorizing charcoal bed. The filtrate obtained was allowed to stand over night and the resulting large, well formed crystals were separated by filtration, washed with isopropanol and dried.

Yield: 465 g. (90% of theory) of 10-(3-dimethylamino propyl) phenothiazine-5-ethyl 5-phenyl malonylureate.
Melting point: 119–120° C.
(Promazine (free base) boils at 208–210° C./3 mm.; the melting point of Phenobarbital is 174° C.)

Example 2

Seven hundred grams (2.18 moles) Promazine hydrochloride and 500 g. (2.16 moles) Phenobarbital were dissolved in two liters methanol. The resulting solution was heated to 45° C. and a warm solution of 86 g. (2.3 moles) sodium hydroxide in 600 ml. water was added slowly with stirring. The resulting reaction mixture was filtered through a Filter:Cel-decolorizing charcoal bed and the filtrate allowed to stand over night. The crystals that had formed were separated by filtration, washed with methanol and dried.

Yield: 938 g. (85% theory) of 10-(3-dimethylamino propyl) phenothiazine-5-ethyl 5-phenyl malonylureate.
The total product was recrystallized from three liters isopropanol.
Yield recrystallized product: 857 g.
Melting point recrystallized product: 119–120° C.
(Promazine hydrochloride melts at 181° C.).

The above two examples illustrate two general procedures that may be employed in preparing the compounds of the invention, the choice between the two methods being dictated by the exact nature of the reactants employed. If the 10-substituted phenothiazine is employed in the form of the free base, interaction between this material and the selected 5,5-disubstituted malonylurea or 5,5-disubstituted manoylthiourea occurs on mild heating (Example 1) of a dry, intimate mixture of the two reactants or of a solution containing the two reactants. If, on the other hand, a salt (e.g. the hydrochloride) of the 10-substituted phenothiazine is employed, then interaction with the selected 5,5-disubstituted malonylurea or 5,5-disubstituted malonylthiourea is preferably accomplished by mild heating of a solution of the two reactants in the presence of a base such as sodium hydroxide (Example 2).

The following compounds are prepared using the methods of Example 1 and Example 2:

10-(3-dimethylamino propyl)phenothiazine-5,5-diethyl malonylureate;
10-(2-dimethylamino 2-methyl ethyl)phenothiazine-5,5-diethyl malonylureate;
10-((1-methyl 3-piperidyl)methyl)phenothiazine-5,5-diethyl malonylureate;
2-chloro 10-(3-(1-methyl 4-piperazinyl)propyl)phenothiazine-5,5-diethyl malonylureate;
2-chloro 10-(3-(1-(2-hydroxyethyl) 4-piperazinyl)propyl) phenothiazine-5,5-diethyl malonylureate;
2-chloro 10-(3-(1-(2-acetoxyethyl) 4 piperazinyl)propyl) phenothiazine-5,5-diethyl malonylureate;

2-acetyl-10-(2-(γ-(3-hydroxypropyl)piperidino-ethyl) phenothiazine-5,5-diethyl malonylureate;
2-acetyl-10-(γ-(hydroxymethyl)piperidino)-propyl)phenothiazine-5,5-diethyl malonylureate;
2-acetyl-10-(3-(γ-(2-hydroxyethyl)piperidino)propyl) phenothiazine-5,5-diethyl malonylureate;
10-(3-(γ-(1-hydroxyethyl)piperidino)propyl)-2-propionyl phenothiazine-5,5-diethyl malonylureate;
10-(3-(γ-(2-hydroxyethyl)piperidino)propyl)-2-propionylphenothiazine-5,5-diethyl malonylureate;
2-acetyl-10-(3-(γ-(3-hydroxypropyl)piperidino)propyl) phenothiazine-5,5-diethyl malonylureate;
2-acetyl-10-(3-(γ-(3-hydroxypropyl)piperidino)-propyl) phenothiazine-5,5-diethyl malonylureate;
10-(3-(γ-(3-hydroxypropyl)piperidino)propyl)-2-propionylphenothiazine-5,5-diethyl malonylureate;
2-butynyl-10-(3-(γ-(3-hydroxypropyl)piperidino)propyl phenothiazine-5,5-diethyl malonylureate;
10-(3-(γ-(3-acetoxypropyl)piperidino)propyl-2-acetylphenothiazine-5,5-diethyl malonylureate; and
1,(2-benzoylethyl)-4-(3-(2-trifluromethyl-10-phenothiazinyl)-propyl)-piperazine-5,5-diethyl malonylureate.

In the manner of Examples 1 and 2, salts using 5-ethyl 5-(1-methyl butyl)malonylurea; 5-ethyl 5-phenoyl malonylurea; 5,5-diethyl malonylthiourea and 5-ethyl 5-(1-methyl butyl)malonylthiourea are prepared with each of the phenothiazines shown above. Thus a total of 72 compounds can be prepared from known compounds having tranquilizing and hypnotic properties respectively.

The 5,5-disubstituted malonylureas are generally prepared by the following method:

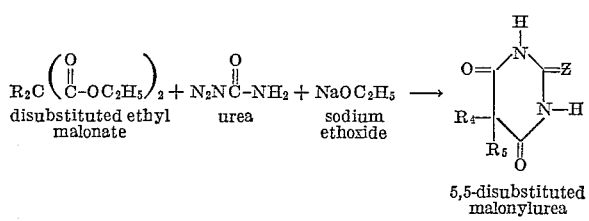

wherein $R_4$ and $R_5$ may be various organic groups. The most common, primarily for the reason of economy of production are where $R_4$ and $R_5$ are lower alkyl and/or phenyl groups. Thus the lower alkyl groups can be propyl, hexyl, octyl, etc. and are predictably active hypnotic compounds; however, the preferred lower alkyl groups are those which have two to five carbon atoms. Thus, 5-amyl 5-phenyl malonylurea and 5,5-diamyl malonylurea for instance would be preferred. The malonylthioureas may be prepared with various substituents in the 5 positions in a like manner. All of these 5,5-disubstituted malonylureas and malonylthioureas are suitable for reaction with the various phenothiazines aforementioned to produce the compounds of this invention.

The preferred 10-(di-lower alkylamino alkyl)phenothiazines are generally prepared using the following method:

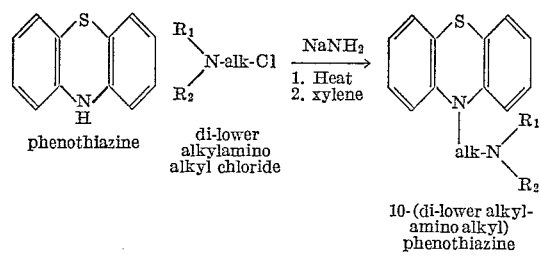

wherein $R_1$ and $R_2$ are lower alkyl groups and alk is an alkylene radical containing one to eight carbon atoms. Thus $R_1$ and $R_2$ can be methyl, hexyl or octyl respectively. All of these compounds predictably have tranquilizing activity. However, for commercial reasons usually $R_1$ and $R_2$ are selected to be methyl. Any of these phenothiazine compounds can be used to produce the compounds of this invention.

In conducting this reaction, the two organic reactants are preferably employed in equimolecular or approximately equimolecular quantities. If a salt of the 10-substituted phenothiazine is used (Example 2), then an amount of base at least stoichiometrically equivalent to the salt form of the 10-substituted phenothiazine is also employed.

The compounds produced by the process of this invention may be solids or liquids, depending upon the identity of the particular pair of organic reactants employed in forming the compounds. Thus, while the Promazine-Phenobarbital compound is a crystalline solid of compartively high melting point (Examples 1 and 2), the Promazine-Nembutal and the Promazine-Thiobarbital compounds prepared in accordance with this invention are liquids. As will be evident to those skilled in the art, the compounds of this invention that are liquid at ordinary room temperature are at least as suitable as the solid, crystalline compounds for the preparation of elixirs and similar liquid formulations and, if desired, may be formulated as dry compositions (tablets, capsules, etcetera) by absorbing or adsorbing the liquid compound on or by a comparatively large quantity of a suitable solid diluent. While the solid, crystalline compounds of this invention are ideally suited for the preparation of dry compositions, they may be formulated as elixirs if desired.

Exact procedures for the formulation of the compounds of this invention into prescription materials will be evident to those skilled in the art. Thus, 8 parts by weight of the compound of Example 1 or 2, 2 parts by weight magnesium stearate (die lubricant) and 17 parts by weight corn starch may be thoroughly mixed and the resulting concentrate incorporated with 73 parts by weight of a suitable base such as sucrose, lactose, corn starch, or the like, following which the whole is thoroughly mixed and tableted. Five grain pills made from this mixture contain about 25 mg. of the compound of this invention. Due to the lack of taste and the neutral reaction of the compounds of this invention these pills need not be coated. A similar formula may be used for capsule filling operations but here the metal stearate ingredient is not required.

Methods for the formulation of the compounds of this invention as elixirs will be immediately apparent to those skilled in the pharmaceutical art.

As has been mentioned previously, the new compounds of this invention are stable towards oxidation, even in the presence of light, and are heat stable. Accordingly, no special precautions need be observed in the preparation of these compounds or the formulation thereof into prescription items. Also, the shelf life of prescription items, containing these compounds is, to all intents and purposes, infinite. It is obviously that a mere physical mixture of the pairs of individual organic reactants employed in forming the compounds of this invention would not exhibit these highly desirable corollary properties of the compounds of this invention.

Also, it has been previously pointed out that the new compounds of this invention are tasteless and neutral in reaction and accordingly formulations containing them, for example, uncoated pills and even elixirs, are well accepted by patients and medication therewith does not give rise to tissue irritation. Again it is obvious that a mere physical mixture of the pairs of individual organic reactants employed in forming the compounds of this invention would not exhibit these highly desirable corollary properties of the compounds of this invention.

With respect to the use of the compounds of this invention in medication, the dosage to be employed is a function of many factors among them being the nature of the pair of organic reactants employed in forming the particular compound being used and the nature of the condition sought to be alleviated. In fixing dosages, reciprocal synergistic effects should be kept in mind. The hypnotic action of the barbiturate portion of the molecule of the compounds of this invention enhances the tranquilizing action of the other portion thereof and the tranquilizing action of the 10-substituted phenothiazine portion of the molecule of the compounds of this invention potentiate the hypnotic action of the barbiturate portion. Because of this reciprocal synergism, in general the dosage of the compounds of this invention should be from about 25% to 50% as great as would be employed were treatment with either a 10-substituted phenothiazine alone or a 5,5-disubstituted malonylurea (or 5,5-disubstituted malonylthiourea) alone being practiced. Taking the Promazine-Phenobarbital compounds of Examples 1 and 2 as a specific example, a daily dosage of around 200 mg. will be sufficient to ameliorate most conditions encountered but in especially severe psychotic states the daily dosage may be increased to 400 mg. without harm. As is generally true, best results are usually obtained if the medication is administered as a series of aliquots of the total daily dosage at intervals of say four to six hours. However, in particularly severe conditions, a massive dose (e.g., 100 mg.) may be administered initially followed by smaller sustaining doses at intervals thereafter.

Considerable study has resulted in the finding that non-ionic chemotherapeutics of this invention are unexpectedly much more effective than would be predicted on the basis of the therapeutic properties of the individual 10-substituted phenothiazine and 5,5-disubstituted malonylureas or malonylthioureas. The result of this finding is that the dosage level can be reduced to one half or one quarter based upon normal dosages of the individual components. But even further when used at this reduced level the new compounds of this invention possess new properties not found in either of the starting compounds.

These unexpected properties are particularly shown in the following clinical findings.

Over a five month period thirteen disturbed patients (psychotic and psychoneurotic) selected at random were closely followed while being administered the test compound formed by the interaction of 10-(3-dimethylamino propyl) phenothiazine and 5-ethyl 5-phenyl malonylurea (Promazine and Phenobarbital). In addition, seven received psychotherapy.

For the first three months, monthly determinations of body functions were ascertained by complete 8 bc. urinalysis and physical examination. During this period, no evidences of liver damage, kidney dysfunction or blood dyscrasis were found.

The functional disorders of the thirteen patients covered the spectrum of mental illnesses, exempting psychosis engendered by toxic states. Four patients were diagnosed as Personality Disorders with superimposed Anxiety Reactions; two Manic-Depressions; three Schizophrenic Reactions; and four Psyco-Neuroses. All patients were quite disturbed when seen.

Dosage schedule was determined by clinicians experience as to the degree of emotional disturbance, and medication was tailored to fit the patient's needs. The level of need was determined to provide effective controlling or effective antipsychotic level. The patients were kept on that level for two weeks before any reduction of dosage was attempted. Dosages are given in milligrams. Two patients were regulated on 100 q.i.d. (four times daily) and h.s. (at bed time); one patient 50 q.i.d. and h.s.; two paients on 50 q.i.d.; four patients on 50 b.i.d. (twice a day) and h.s.; one patient on 100 b.i.d. and h.s.; One patient on 50 a.m. (in morning) and h.s.

The patients on these dosages showed very satisfactory response during the first three months of the test. As a result, quasi-double-blind studies were conducted for two and a one half months with the test compound and the products sold under the trademarks: Librium (7-chloro-2-methyl-5-phenyl-3H-1,4-benzyl diaylpine-4-oxide), Meprobamate (2-methyl-2-propyl-1,3-propanediol dicarbamate) and Prozine (Meprobamate and Promazine hydrochloride) and Phenobarbital (5-ethyl-5-phenyl malonylurea). The results of this test were as follows:

|  | Librium | Meprobamate | Pnenobarbital |
|---|---|---|---|
| Anti-pshchotic effectiveness | Poor | Poor | Poor. |
| Anti-neurotic effectiveness | Very good | Very good | Do. |
| Early action | Good | Good | Do. |
| Late action |  |  |  |
| Patient's tolerance of drug | Excellent | Excellent | Very good. |

|  | Test Compound | Prozine |
|---|---|---|
| Anti-psychotic effectiveness | Excellent | Very good. |
| Anti-neurotic effectiveness | do | Do. |
| Early action | do | Do. |
| Late action |  |  |
| Patient's tolerance of drug | Excellent | Excellent. |

The test compound was found to be a highly effective antipsychotic and anti-psychoneurotic which was free from side reaction. The test compound was found to be excellent in all respects and superior in the majority of criteria tested to the drugs tested against it.

The reason for the unexpected activity of the compounds of this invention is not known. However, it is hypothesized that the result is attained because the compounds of this invention are non-ionic. The compounds can thus much more readily penetrate the blood brain barrier. This concept is discussed in Drug Trade News, October 2, 1961, page 50. Since the starting compounds are ionic they do not possess this property. One point which tends to sustain this position is that the non-ionic compounds of this invention are highly soluble in chloroform which is a lipid solvent while the ionic phenothiazines or 5,5-disubstituted malonylureas or malonylthioureas are quite insoluble. The non-ionic character of the compounds of this invention could account for the increased activity and unexpected properties.

It is to be understood that the invention is not to be limited to the exact compounds shown and described, as obvious modifications and equivalents will be apparent to one skilled in the art, and the invention is therefore to be limited to what is fairly within the scope of the appended claims.

I claim:
1. A phenothiazine salt which is the adduct of:
 (a) a member selected from the group consisting of 10-(3-dimethylamino propyl)phenothiazine, 10-(2-dimethylamino-2-methylethyl)phenothiazine, 2-chloro 10-(3-dimethylamino propyl)phenothiazine, 10-((1-methyl 3-piperidyl)methyl)phenothiazine, 2-chloro 10 - (3-(1-methyl 4-piperazinyl)propyl)phenothiazine, 2-chloro 10-(3-(1-(2-hydroxyethyl) 4-piperazinyl)propyl)phenothiazine and 2-chloro 10-(3-(1-(2-acetoxyethyl) 4-piperazinyl)propyl)phenothiazine; and
 (b) a member selected from the group consisting of 5,5-diethylmalonylurea, 5-ethyl 5-(1-methyl butyl) malonylurea, 5-ethyl 5-phenylmalonylurea, 5,5-diethylmalonyethiourea and 5-ethyl 5-(1-methyl butyl) malonylthiourea.

2. 10-(3-dimethylamino propyl)phenothiazine-5-ethyl 5-phenylmalonylureate.

3. 10-(3-dimethylamino propyl)phenothiazine-5-ethyl 5-(1-methyl butyl)malonylureate.

4. 10-(3-dimethylamino propyl)phenothiazine-5,5-diethylmalonylthioureate.

5. 10-(3-dimethylamino propyl)phenothiazine-5,5-diethylmalonylureate.

6. 10-(3-dimethylamino propyl)phenothiazine-5-ethyl 5-(1-methyl butyl)malonylthioureate.

References Cited in the file of this patent

UNITED STATES PATENTS

| | | |
|---|---|---|
| 1,879,389 | Mietzsch | Sept. 27, 1932 |
| 2,678,313 | Schnider | May 11, 1954 |
| 2,921,069 | Ullyot | Jan. 12, 1960 |
| 3,000,885 | Cusic | Sept. 19, 1961 |
| 3,000,886 | Edgerton et al. | Sept. 19, 1961 |

FOREIGN PATENTS

| | | |
|---|---|---|
| 1,001,455 | Germany | Jan. 24, 1957 |
| 880,334 | Great Britain | Oct. 18, 1961 |
| 35–5782 | Japan | May 25, 1960 |

OTHER REFERENCES

Fieser et al.: "Organic Chemistry," 2nd edition, pages 242–243, D. C. Heath and Company (1950).

Barber et al.: J. Appl. Chem., vol. 2, pages 565–575 (1952).

Kido et al.: Ann. Rept. Shionagi Research Lab., vol. 7, pages 387 to 392 (1957).